United States Patent
Kawashima et al.

(10) Patent No.: US 8,378,785 B2
(45) Date of Patent: Feb. 19, 2013

(54) IMAGE DISPLAY DEVICE AND METHOD FOR CONTROLLING THE SAME

(75) Inventors: Ikue Kawashima, Kanagawa (JP); Soichi Nagamatsu, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 768 days.

(21) Appl. No.: 12/431,007

(22) Filed: Apr. 28, 2009

(65) Prior Publication Data

US 2009/0278657 A1 Nov. 12, 2009

(30) Foreign Application Priority Data

May 9, 2008 (JP) ................................. 2008-123509

(51) Int. Cl.
- G08B 29/04 (2006.01)
- G06F 7/04 (2006.01)
- G09G 5/00 (2006.01)

(52) U.S. Cl. ................. 340/5.81; 340/568.1; 340/572.1; 340/686.1; 345/204

(58) Field of Classification Search ................. 340/5.74, 340/5.8–5.81, 5.2–5.32, 568.1, 572.1, 686.1; 345/1.73, 158, 169, 204, 901, 905; 382/312–315
See application file for complete search history.

(56) References Cited

U.S. PATENT DOCUMENTS

| | | | | |
|---|---|---|---|---|
| 4,899,228 A * | 2/1990 | Sano et al. | ...................... | 358/473 |
| 6,141,436 A * | 10/2000 | Srey et al. | ...................... | 382/124 |
| 6,411,277 B1 * | 6/2002 | Shah-Nazaroff | .............. | 345/157 |
| 6,466,198 B1 * | 10/2002 | Feinstein | ...................... | 345/158 |
| 7,047,419 B2 * | 5/2006 | Black | ............................ | 713/186 |
| 7,202,773 B1 * | 4/2007 | Oba et al. | ....................... | 340/5.8 |
| 2004/0204016 A1 * | 10/2004 | Sakamoto | .................. | 455/550.1 |
| 2005/0156882 A1 * | 7/2005 | Manchester | ................... | 345/158 |
| 2005/0216867 A1 * | 9/2005 | Marvit et al. | ................ | 715/863 |
| 2005/0225427 A1 * | 10/2005 | Bell et al. | ....................... | 340/5.2 |
| 2005/0253815 A1 | 11/2005 | Blacklock et al. | | |
| 2006/0115130 A1 * | 6/2006 | Kozlay | .......................... | 382/117 |
| 2006/0136734 A1 * | 6/2006 | Telek et al. | .................... | 713/182 |
| 2007/0096088 A1 | 5/2007 | Tano et al. | | |

(Continued)

FOREIGN PATENT DOCUMENTS

| | | |
|---|---|---|
| EP | 1 115 054 A2 | 7/2001 |
| EP | 1 115 054 A3 | 7/2001 |
| EP | 1 376 992 A2 | 1/2004 |
| EP | 1 376 992 A3 | 1/2004 |
| JP | 2006-53688 | 2/2006 |
| WO | WO 2005/099105 A1 | 10/2005 |

*Primary Examiner* — Benjamin C Lee
*Assistant Examiner* — Stephen Burgdorf
(74) *Attorney, Agent, or Firm* — Oblon, Spivak, McClelland, Maier & Neustadt, L.L.P.

(57) ABSTRACT

A disclosed image display device includes a display part; a user identifying part configured to perform personal identification to identify personal identification information; a detecting part configured to detect whether the image display device is held by hand; and a control part configured to display an image on the display part upon a display request when the user identifying part identifies personal identification information obtained upon the display request as personal identification information of an authorized user, to continue displaying the image on the display part as long as the detecting part detects that the image display device is held by hand, and to erase the image on the display part when the user identifying part fails to identify the personal identification information of the authorized user by a personal identification performed upon detecting by the detecting part that the image display device is not held by hand.

6 Claims, 3 Drawing Sheets

U.S. PATENT DOCUMENTS

| | | |
|---|---|---|
| 2007/0290791 A1* | 12/2007 | Batra ................... 340/5.31 |
| 2008/0013152 A1 | 1/2008 | Hirano et al. |
| 2008/0061288 A1 | 3/2008 | Tomono et al. |
| 2008/0224822 A1* | 9/2008 | Gelman et al. ........... 340/5.2 |
| 2008/0238609 A1* | 10/2008 | Wiesner et al. ........... 340/5.2 |
| 2009/0014715 A1 | 1/2009 | Yamaga et al. |
| 2009/0025215 A1 | 1/2009 | Murakami et al. |
| 2010/0008545 A1* | 1/2010 | Ueki et al. ............. 382/115 |

* cited by examiner

IMAGE DISPLAY DEVICE AND METHOD FOR CONTROLLING THE SAME

BACKGROUND OF THE INVENTION

1. Field of the Invention

The present invention generally relates to an image display device such as electronic paper and a portable display device, and a method for controlling the image display device.

2. Description of the Related Art

Highly-confidential images and the like in these types of image display devices may be browsed by others without permission and leaked out.

In electronic paper disclosed in Patent Document 1, a fingerprint pattern of a specific user who is authorized to use the electronic paper is recorded in advance. When a user starts operating the electronic paper, the user is required to touch his/her finger onto a fingerprint detector incorporated in the electronic paper to read a fingerprint pattern of the user. The personal identification is performed by comparing the fingerprint pattern of the user with the fingerprint pattern recorded in the electronic paper. When the user is identified as the authorized user by the personal identification, the user can display various images stored in the electronic paper on a display device. Further, in the case where personal identification is regularly performed when an image is being displayed on the display device, and a user is identified as the authorized user, the image is continuously displayed on the display device. When the user is not identified as the authorized user, the image displayed on the display device is erased.

In this manner, in the electronic paper disclosed in Patent Document 1, when a user is identified as the user authorized to use the electronic paper, an image is displayed on the display device. Accordingly, leakage of the image to others except for the specific user authorized to use the electronic paper is suppressed.

Patent Document 1: Japanese Patent Application Publication No. 2006-53688

Usually, images displayed on the electronic paper are browsed by only an authorized user. However, the image is sometimes required to be shared with others, such as by handing over the electronic paper displaying the image to a user unauthorized to use the electronic paper so that the unauthorized user can browse the displayed image. In this case, when the electronic paper disclosed in Patent Document 1 is used, the unauthorized user is not identified as the authorized user by the above-described regularly performed personal identification after the electronic paper is handed over to the unauthorized user. Therefore, the image displayed on the electronic paper is erased by the next regular personal authorization.

Here, the regular personal identification performed with an image displayed on the electronic paper may be set to be performed with a time interval which is long enough for the unauthorized user to browse the image after receiving the electronic paper. However, when the electronic paper displaying the image is left on a table and the like, the electronic paper keeps the display of the image until the next personal identification is performed. Therefore, there is a problem in that the image displayed on the electronic paper may be browsed by a third party and leaked out.

The present invention is made in light of the above-described circumstances and it is an object of at least one embodiment of the present invention to provide an image display device by which an image displayed on a device body of the image display device can be shared with a user unauthorized to use the image display device and leakage of the image can be suppressed.

SUMMARY OF THE INVENTION

According to one aspect of the present invention, an image display device includes a display part to display an image; a user identifying part to perform personal identification to identify personal identification information; a hold detecting part to detect whether the image display device is held by hand; and a control part to display an image on the display part upon a display request when the user identifying part identifies personal identification information obtained upon the display request as personal identification information of an authorized user, to continue displaying the image on the display part as long as the hold detecting part detects that the image display device is held by hand, and to erase the image on the display part when the user identifying part fails to identify the personal identification information of the authorized user by a personal identification performed upon detecting by the hold detecting part that the image display device is not held by hand.

According to another aspect of the present invention, a method for controlling an image display device including a display part to display an image is provided. The method includes the steps of displaying the image on the display part when the displaying of the image is allowed; continuing to display the image on the display part as long as the image display device is held by hand; and erasing the image displayed on the display part upon finding that the displaying of the image is no longer allowed when the image display device is not held by hand.

DETAILED DESCRIPTION OF THE PREFERRED EMBODIMENTS

An embodiment of applying an image display device of the present invention to an information display device 1 is described below.

An electrophoresis information display device driven by thin film transistors (TFTs) of our product is employed as the information display device 1. The information display device is a known information display device formed by a transparent display substrate, a back substrate, and colored particles (movable members) filled in parts corresponding to pixels between the display substrate and the back substrate. The TFTs are driven so that the colored particles in the parts corresponding to the pixels are moved by electrophoresis to the display substrate side or the back substrate side. An image is displayed by utilizing the colors of the colored particles moved to the display substrate side.

The information display device 1 may be any type of information display device as long as it is portable. In specific, the information display device 1 may be a liquid crystal display device, an EL (Electroluminescent) information display device, an electrophoresis information display device, an electrowetting information display device, an electrochromic information display device, and the like. Further, the present invention can be applied to information display devices having various sizes such as a portable phone, electronic book type, document-sized, and newspaper-sized information display devices. The information display device may have flexibility.

Figure 1:
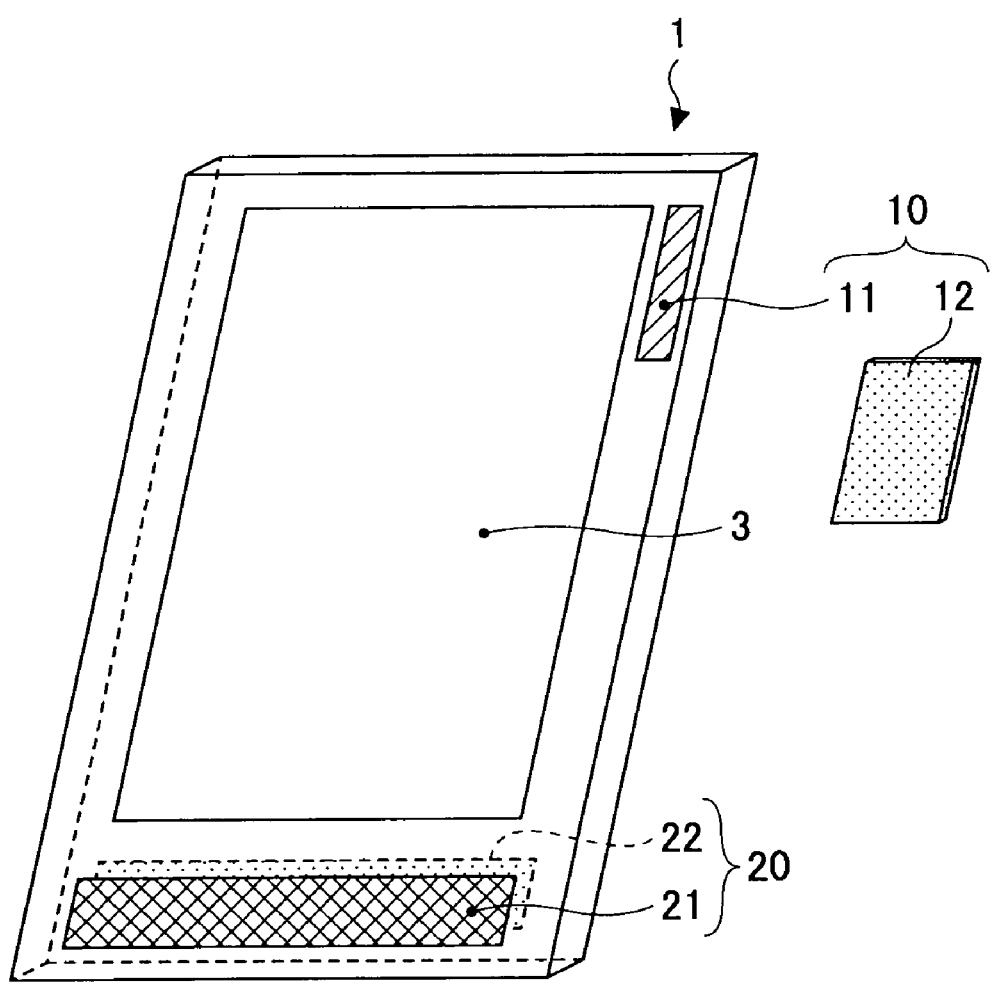
FIG. 1 is a schematic configuration diagram of an information display device according to an embodiment of the present invention.

FIG. 1 is a schematic configuration diagram of the information display device 1 according to the present embodiment. The information display device 1 includes a display part 3 displaying an image, a user identifying part 10 serving as a personal identifying part to identify whether a user is a specific user authorized to use the information display device 1, and a hold detecting part 20 to detect whether a body of the information display device 1 (device body) is held by a hand of a user.

Figure 2:
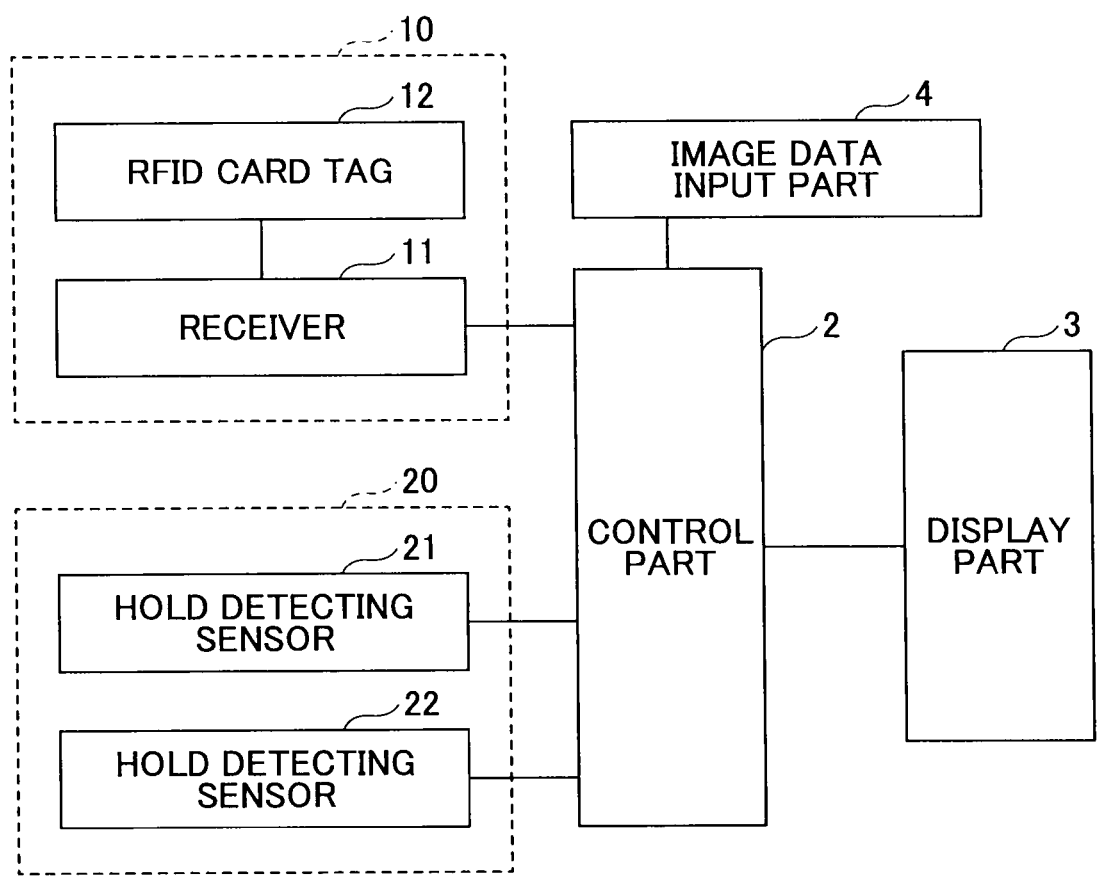
FIG. 2 is a block diagram according to an embodiment of the present invention.

FIG. 2 shows a block diagram showing a relationship among these parts. As shown in FIG. 2, the information display device 1 includes a control part 2 formed of a CPU, a memory, and the like; an image data input part 4 to input image data from outside the device body to the control part 2 and the like, in addition to the display part 3; the user identifying part 10; and the hold detecting part 20. The image data inputted from the image data input part 4 are stored in the memory of the control part 2. The control part 2 causes the display part 3 to display an image according to the stored image data. The control part 2 performs control to continue displaying the image on the display part 3 or erase the image, according to an identification result of the user identifying part 10 and a detection result of the hold detecting part 20, which is described below.

The information display device 1 of this embodiment includes two hold detecting sensors 21 and 22 serving as the hold detecting part 20 as shown in FIG. 1. The hold detecting sensor 21 is provided on a front surface side (a side where the display part 3 displays an image) of the device body and the hold detecting sensor 22 is provided on a back surface side of the device body.

In this embodiment, identification is performed wirelessly. As an example of the user identifying part 10, an RFID (Radio Frequency Identification) and wireless ID authentication were used. Specifically, a long range RFID reader TGU-RW 311 manufactured by Fujitsu Frontech Limited was connected by USB connection to the device body to serve as a receiver 11, which receives personal identification information inputted from an RFID card tag 12 shown in FIG. 1. The receiver 11 may be incorporated in the device body. As the RFID card tag 12 shown in FIG. 1 carried by a user, an RFID card tag TGU-TP111 manufactured by Fujitsu Frontech Limited was used.

In the information display device 1 of this embodiment, an algorithm was developed with software so that signals which cause an image to be displayed are not inputted to the control part 2 unless a user is identified by the user identifying part 10.

A pressure sensor sheet "Sealer" manufactured by Nitta Corporation was used as the hold detecting sensors 21 and 22. The pressure sensor sheet "Sealer" was provided at two positions, namely, on the front surface side and the back surface side of the information display device 1, so that sensors of the pressure sensor sheets corresponding to the hold detecting sensors 21 and 22 are on the same straight line perpendicularly passing through the surface of the display part 3.

Under the above configuration, an algorithm was developed with software, so that the control part 2 determines that a user is holding the device body when a pressure position detected by the hold detecting sensor 21 on the front surface side of the device body and a pressure position detected by the hold detecting sensor 22 on the back surface side of the device body are on the same line in a direction of a thickness of the device body (a direction from the front surface side to the back surface side of the device body). Accordingly, the control part 2 can easily determine whether a user is holding the device body by a hand.

Further, an algorithm was developed with software so that the image displayed on the display part 3 is automatically erased from the display part 3 by the control part 2 when the device body is not held by a user and an authorized user is not continuously identified.

Next, operations of the control part 2 to display an image, erase an image, and hold an image displayed on the display part 3 were verified by using the information display device 1 of this embodiment.

A dependence of the RFID card tag 12 (TGU-TP111) used for identification on a distance from the device body was checked. Then, it was found that the identification is not performed when there is a distance of 5 meters or more between the RFID card tag 12 and the device body.

First, it was verified if an image can be displayed on the display part 3 which is not displaying an image, depending on the presence and absence of the identification.

When there was a distance of 1 meter between the RFID card tag 12 and the device body, in other words, when the identification can be performed, an image could be displayed on the display part 3 of the display body. On the other hand, when there was a distance of 5 meters or more between the RFID card tag 12 and the device body, in other words, when the identification cannot be performed, an image could not be displayed on the display part 3 of the device body.

In this manner, when a new image is displayed on the display part 3 on which an image is not displayed or when an image which is once erased is displayed again on the display part 3, identification of a user is performed by the user identifying part 10. This makes it possible to reliably identify a user by a simple function and ensure the security in displaying an image.

Next, when the device body displaying the image on the display part 3 was left on a table, it was verified if the image displayed on the display part 3 is continuously displayed or erased depending on the presence or absence of the identification.

When there was a distance of 1 meter between the RFID card tag 12 and the device body left on the table, in other words, when the identification can be performed, the image displayed on the display part 3 of the device body was continuously displayed.

On the other hand, when there was a distance of 5 meters or more between the RFID card tag 12 and the device body left on the table, in other words, when the identification cannot be performed, the image was erased from the display part 3 of the device body.

In this manner, the continuous identification of a user by the user identifying part 10 is one of the conditions to continue displaying the image on the display part 3 of the device body in this embodiment.

For example, the information display device 1 capable of being held by a hand as in this embodiment is often used by holding the device body by a hand to see a displayed image. However, since the device body has excellent portability, such cases can be presumed where a user sees an image displayed on the display part 3 of the device body placed on a table and the like. When the user places the device body on the table and the like to see an image displayed on the display part 3, it is inconvenient if the image displayed on the display part 3 is erased unless the user is holding the device body.

Therefore, the information display device 1 of this embodiment has a function to continue displaying the image on the display part 3 as long as the receiver 11 of the user identifying part 10 provided in the device body keeps receiving the personal identification information of a specific user by wireless communications and the like from the RFID card tag 12. Accordingly, the above-described inconvenience can be resolved.

Next, when a user is holding the device body having the display part 3 displaying the image, it was verified if the display part 3 continues displaying or erases the image displayed on the display part 3 depending on the presence or absence of the identification.

When there was a distance of 5 meters or more between the RFID card tag 12 and the device body, in other words, when the identification cannot be performed, the image was continuously displayed on the display part 3 in the case where a user is holding the display device. When the user stops holding the display body, the image displayed on the display part 3 was automatically erased.

Moreover, when the device body having the display part 3 displaying an image was handed over to others by keeping the device body held, the image was continuously displayed on the display part 3 even without the identification.

In this manner, continuous detection by the hold detecting sensors 21 and 22, of the information that the device body is held, is one of the conditions to continue displaying the image on the display part 3 of the device body in this embodiment.

When using the information display device 1 capable of being held by a hand as in this embodiment, an image may be seen by only a user who caused the image to be displayed on the display part 3, however, there may be a case where the user wishes to show the image to a person nearby, since the device body has excellent portability. In this case, by handing over the information display device 1 to the person nearby, the hold detecting part 20 of the information display device 1 continuously detects the holding of the device body. Therefore, the information can be shared by quite a simple way with high security.

As described above, when the device body of the information display device 1 held by a user is left on a table with a distance of 5 meters or more from the RFID card tag 12, the displayed information is automatically erased. That is, when the hold detecting sensor 21 and 22 detect that the device body is not held, the displayed information are erased unless the identification of a user is continuously achieved. Accordingly, even when a display medium having a memory property is used, an image displayed on the display part 3 of the device body left on a table and the like is automatically erased at once unless the personal identification information is continuously authenticated. Therefore, the device body is not left with the image displayed on the display part 3. Thus, a sneak shot of the image by a digital camera or a portable phone having a camera function can be prevented, and the security of the image can be ensured by quite a simple mechanism.

When light-emitting type display elements are used for the display part 3 to display an image, power consumption can be reduced by erasing the image displayed on the display part 3 of the device body when the identification of a user is not continuously authenticated and the device body is left on a table and the like. This function is effective in view of power saving as well.

Figure 3:
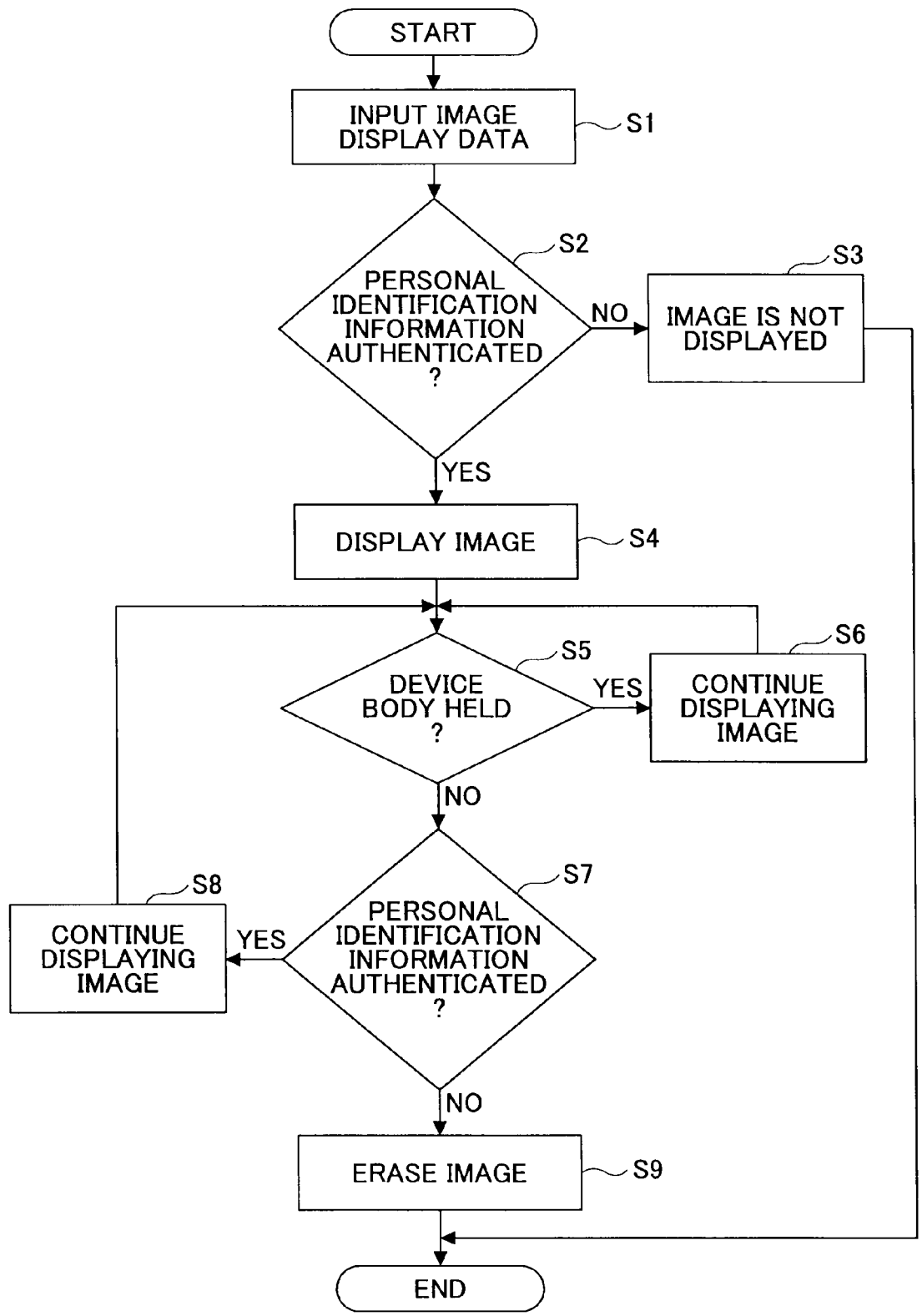
FIG. 3 is a flowchart of a control method performed by a control part.

The verification results described above can be expressed by a flowchart shown in FIG. 3.

First, image display data are inputted to the control part 2 when the display part 3 is not displaying an image. When personal identification information of a user is not authenticated by the user identifying part 10 (NO in S2), the control part 2 performs a control not to display an image on the display part 3 (S3). When the personal identification information of the user is authenticated by the user identifying part 10 (YES in S2), the control part 2 performs a control to display an image on the display part 3 (S4). After the image is displayed on the display part 3, the hold detecting part 20 detects whether a device body is held by a user (S5). When the hold detecting part 20 detects that the device body is held by the user (YES in S5), the control part 2 performs a control to continue displaying the image on the display part 3 (S6). When the hold detecting part 20 does not detect that the device body is held by a user (NO in S5), the user identifying part 10 performs user identification (S7). When the user identifying part 10 authenticates personal identification information of a user (YES in S7), the control part 2 performs a control to continue displaying the image on the display part 3 (S8). When the user identifying part 10 does not authenticate personal identification information of a user (NO in S7), the control part 2 performs a control to erase the displayed image from the display part 3 (S9).

In this embodiment, according to the above-described verification results, an image on the display part 3 displayed by a user authorized to use the information display device can be browsed by an unauthorized user by receiving the device body from the authorized user.

That is, the authorized user holds the device body so that the hold detecting part 20 detects that the device body is held and the image displayed on the display part 3 is continuously displayed. For example, the user may start holding the device body when the user displays an image on the display part 3 that is not displaying an image, so that the hold detecting part 20 detects that the device body is held. The device body having the display part 3 displaying the image is handed over from the authorized user to the unauthorized user by keeping the device body held so that the hold detecting part 20 continuously detects that the device body is held. Accordingly, while the hold detecting part 20 is detecting that the device body is held by the unauthorized user, the image is continuously displayed on the display part 3. Accordingly, the unauthorized user can browse the image displayed on the display part 3 by the authorized user by receiving the device body from the authorized user.

When the unauthorized user leaves the device body on a table and the like after receiving the device body and browsing the image, the hold detecting part 20 does not detect that the device body is held anymore. At this time, unless a user is identified as the authorized user through the personal identification by the user identifying part 10, the image displayed on the display part 3 is erased. When the image erased from the display part 3 is to be displayed again, a user is required to be identified as the authorized user by the user identifying part 10. That is, after the image is erased from the display part 3, a user other than the authorized user cannot display the image again on the display part 3. Therefore, even when the unauthorized user receives the device body having the display part 3 displaying the image from the authorized user and leaves the device body on a table and the like, a third party cannot browse the image. Thus, the image is not leaked out.

The hold detecting sensors 21 and 22 included in the hold detecting part 20 used in this embodiment may be, for example, an optical sensor, a pressure sensor, and a surface potential sensor. Among these sensors, it is most preferable to use a pressure sensor in view of cost, stability of the sensitivity of sensor, and the like. The pressure sensor may be selected from various types, such as resistance change detecting type, electrostatic capacitance detecting type, and electromagnetic induction type pressure sensors.

The user identifying part 10 may employ fingerprint authentication, vein authentication, wireless ID authentication, and the like.

In the case where the fingerprint authentication or the vein authentication is employed for the user identifying part 10, and performed all the time while a user is holding the information display device 1, the identification is stopped when the user releases his/her hand from the information display device 1 by placing the information display device 1 on a table and the like.

On the contrary, the wireless ID authentication is most preferable, which is employed in the information display device 1 of this embodiment. It is because a user is continuously identified even when the user releases his/her hand from the device body to see an image displayed on the display part 3 by placing the information display device 1 on the table, as long as the user is close to the information display device 1. More specifically, it is a most preferable configuration to achieve the most inexpensive and simplest identifying part, to provide a user of the information display device 1 with an RFID to be carried and provide a receiver of the RFID in the information display device 1.

According to this embodiment as described above, the information display device 1 including the display part 3 to display an image and the user identifying part 10 serving as a personal identifying part to identify whether a user is a user authorized to use the device body according to the personal identification information is provided. When a user is identified as the authorized user by the user identifying part 10, an image can be displayed on the display part 3 which is not displaying the image. The information display device 1 further includes the hold detecting part 20 to detect whether the device body is held, and the control part 2. When the display part 3 is displaying an image, the control part 2 at least performs a control to continue displaying the image on the display part 3 when the hold detecting part 20 detects that the device body is held, and a control to erase the displayed image from the display part 3 when the hold detecting part 20 does not detect that the device body is held and the user identifying part 10 does not identify a user as the authorized user by personal identification. Accordingly, an image displayed on the display part of the device body can be shared with a user unauthorized to use the device body while suppressing leakage of the image, as described above.

Further, according to this embodiment, in the case where the image is displayed on the display part 3, the control part 2 at least performs a control to continue displaying the image on the display part 3, when the hold detecting part 20 does not detect that the device body is held and a user is identified as the authorized user through the personal identification by the user identifying part 10. Accordingly, the authorized user can place the device body having the display part 3 displaying the image on a table and the like to browse the image without holding the device body.

Further, according to this embodiment, the hold detecting part 20 includes the hold detecting sensor 21 serving as a first hold detecting member provided on a front surface side of the device body on which the display part displays an image, and the hold detecting sensor 22 provided on the back surface side of the device body which is an opposite side of the device body to the front surface side. As described above, the hold detecting part 20 can easily detect whether the device body is held by a user's hand when hold positions detected by the hold detecting sensors 21 and 22 are on the same straight line perpendicularly crossing the front and back surfaces.

Further, according to this embodiment, a pressure sensor is most preferably used as the hold detecting part 20, that is the hold detecting sensors 21 and 22, in view of cost, stability of the sensitivity of the sensors, and the like.

Further, according to this embodiment, it is most preferable that the user identifying part 10 wirelessly perform personal identification (user identification) to continuously identify the user as long as the user is close to the information display device 1.

Further, according to this embodiment, the user identifying part 10 includes the RFID card tag 12 serving as a personal identification information recording part which records personal identification information of a user and can be carried by the user, and the receiver 11 serving as a personal identification information acquiring part provided for the device body, which acquires the personal identification information recorded in the RFID card tag 12. The receiver 11 wirelessly acquires the personal identification information from the RFID card tag 12. This configuration is preferable as the most inexpensive and simplest wireless identifying part.

According to the present invention, the following measures are taken so that an image displayed on a display part of an image display device by a user identified by a personal identifying part as a user authorized to use the image display device can be browsed by another user unauthorized to use the image display device, when the device body is handed over from the authorized user to the unauthorized user.

That is, the authorized user holds a device body of the image display device so that a hold detecting part detects that the device body is held and an image displayed on the display part is continuously displayed. For example, the authorized user may start holding the device body when the user displays an image on the display part that is not displaying an image, so that the hold detecting part 20 detects that the device body is held. Then, the device body displaying the image on the display part is handed over from the authorized user to the unauthorized user by keeping the device body held, so that the hold detecting part continues detecting that the device body is held. Accordingly, while the hold detecting part detects that the device body is held by the unauthorized user, the display part continues displaying the image. Therefore, the user unauthorized to use the image display device can browse the image displayed on the display part by the authorized user by receiving the device body from the authorized user.

When the unauthorized user who received the device body stops holding the device body, the hold detecting part does not detect that the device body is held anymore. At this time, when the user is not identified as the authorized user by the personal identification performed by the personal identifying part, the image displayed on the display part is erased. Further, when the image erased from the display part is to be displayed again, a user is required to be identified as the authorized user by the personal identifying part. That is, after the image is erased from the display part, only the authorized user can display the image again. Therefore, even when the unauthorized user who received the device body displaying the image on the display part from the authorized user leaves the device body on a table and the like, a third party cannot browse the image. Thus, the image is not leaked out.

According to one embodiment, there is an excellent effect in that an image displayed on a device body can be shared with a user unauthorized to use the device body while suppressing leakage of the image.

This patent application is based on Japanese Priority Patent Application No. 2008-123509 filed on May 9, 2008, the entire contents of which are hereby incorporated herein by reference.

What is claimed is:

1. An image display device comprising:
a display part configured to display an image;
a user identifying part configured to perform personal identification to identify personal identification information;
a hold detecting part configured to detect whether the image display device is held by hand; and
a control part configured to display an image on the display part upon a display request when the user identifying part identifies personal identification information obtained upon the display request as personal identification information of an authorized user who is allowed to use the image display device, to continue displaying the image on the display part as long as the hold detecting part detects that the image display device is held by hand, and to erase the image on the display part when the user identifying part fails to identify the personal identification information of the authorized user by a personal identification performed upon detecting by the hold detecting part that the image display device is not held by hand, wherein
the hold detecting part includes a first hold detecting member provided on a front surface side of the image display device, said front surface side being the same side as a side of the display part on which the image is displayed, and a second hold detecting member provided on a back surface side of the image display device, said back surface side being on an opposing side of the image display device to the front surface side; and detects that the image display device is held by hand when holding positions detected by the first and second hold detecting members are on the same straight line perpendicularly passing through the front and back surfaces, and
the control part is configured to continually display the image on the display part after the image display device is transferred between the authorized user and an unauthorized user for as long as the image display device remains in a continuous handheld state.

2. The image display device as claimed in claim 1, wherein in a state where the image is displayed on the display part, the control part continues displaying the image on the display part when the user identifying part identifies the personal identification information of the authorized user by a personal identification performed upon detecting by the hold detecting part that the image display device is not held by hand.

3. The image display device as claimed in claim 1, wherein the hold detecting part is a pressure sensor.

4. The image display device as claimed in claim 1, wherein the user identifying part performs the personal identification wirelessly.

5. The image display device as claimed in claim 1, wherein the user identifying part includes a personal identification information recording part recording the personal identification information and capable of being carried by a user and a personal identification information acquiring part provided for the image display device to acquire the personal identification information recorded in the personal identification information recording part; and the personal identification information acquiring part acquires the personal identification information from the personal identification information recording part wirelessly.

6. A method for controlling an image display device including a display part configured to display an image, the method comprising the steps of:
displaying the image on the display part when the displaying of the image is allowed;
continuing to display the image on the display part as long as the image display device is held by hand; and
erasing the image displayed on the display part upon finding that the displaying of the image is no longer allowed when the image display device is not held by hand, wherein
a detection of whether the image display device is held by hand is performed by a hold detecting part including a first hold detecting member provided on a front surface side of the image display device, said front surface side being the same side as a side of the display part on which the image is displayed, and a second hold detecting member provided on a back surface side of the image display device, said back surface side being on an opposing side of the image display device to the front surface side, the hold detecting part detecting that the image display device is held by hand when holding positions detected by the first and second hold detecting members are on the same straight line perpendicularly passing through the front and back surfaces, and
the continuing includes continually displaying the image on the display part after the image display device is transferred between an authorized user and an unauthorized user for as long as the image display device remains in a continuous handheld state.

* * * * *